COMBINED FREQUENCY SHIFT AND PHASE SHIFT KEYING

Filed Jan. 23, 1962 4 Sheets-Sheet 1

INVENTOR.
MAYNARD D. Mc. FARLANE

BY
Mead, Browne, Schuyler & Beveridge
ATTORNEYS

Dec. 14, 1965 M. D. McFARLANE 3,223,779

COMBINED FREQUENCY SHIFT AND PHASE SHIFT KEYING

Filed Jan. 23, 1962 4 Sheets-Sheet 2

INVENTOR.
MAYNARD D. Mc FARLANE
BY
Mead, Browne, Schuyler & Beveridge
ATTORNEYS

INVENTOR.
MAYNARD D. Mc FARLANE
BY
Mead, Browne, Schuyler & Beveridge
ATTORNEYS

INVENTOR.
MAYNARD D. Mc FARLANE
BY
Mead, Browne, Schuyler & Beveridge
ATTORNEYS

United States Patent Office 3,223,779
Patented Dec. 14, 1965

3,223,779
COMBINED FREQUENCY SHIFT AND PHASE SHIFT KEYING

Maynard D. McFarlane, Corona del Mar, Calif., assignor to Robertshaw Controls Company, Richmond, Va., a corporation of Delaware Filed Jan. 23, 1962, Ser. No. 168,122
29 Claims. (Cl. 178—66)

This invention relates to communication systems for multiplexing of information signals upon a carrier wave in the form of simultaneous digital step-phase and step-frequency modulations.

It has previously been known to transmit information in binary form by frequency-shift techniques in which two generated carrier frequencies are transmitted alternatively by a transmitter keying process. It is also known to transmit a single frequency and to step the phase according to binary coded information, or quaternarily coded information, or the like. The urgent need for additional channels of information has resulted in many efforts at duplexing or multiplexing the transmitted information to provide several channels of information on a single carrier band of frequencies. This has usually taken the form of multiple step-phase transmission or of multiple frequency-step transmission in those situations where band width considerations, simplicity, reliability and other factors dictate the use of binary coded information to achieve high rates of transmission in the narrow band width. It has not previously been possible to employ a second channel of information as a further modulation of a frequency-shift system without adding proportionately to the band width requirements. Thus, there has been little advantage in duplexing a frequency-shift system. It has also not been possible heretofore to combine the frequency-shift and phase-shift channels in a system to conserve band width.

In a phase-shift communication system a single frequency is transmitted, the phase is shifted by a keying operation, the carrier being continuously transmitted with either zero or a predetermined shift of phase, according to the keying signal. The receiving apparatus receives and filters this carrier wave, develops therefrom a phase-reference signal and detects changes from the reference signal thereby to present at the receiving apparatus a signal corresponding to the keying signal at the transmitter. This type of a communication system requires a constant frequency recoverable in stable form at the receiving apparatus and a reference signal at the receiving station having predetermined phase relation to the zero phase at the transmitter.

A keyed frequency-shift communication system employs at the transmitting apparatus two or more discrete constant frequencies and a frequency-shifting circuit usually in the form of keying circuit, which causes one or another of the generated frequencies to be transmitted, preventing transmission of any other such generated frequency at each instant. A phase-shifting system requires circuitry for advancing or retarding the phase of a particular frequency. The specific values of capacitance, inductance or resistance which may be employed to shift the phase by 120 degrees, for example, at one frequency are not effective to produce the same phase shift at another frequency. It is therefor apparent that a keyed transmission system combining both frequency-shift and phase-shift information indications on a carrier encounters difficulties not present with either system alone and such a combined system has not heretofore been practically realized.

It is one object of the present invention to provide a system wherein keyed-phase and keyed-frequency shifts of a carrier wave may be employed for simultaneous transmission of a number of information signals within the same carrier band width required for a single channel of such information.

Another object is to provide a receiver for recovering the information signals so transmitted.

Another object is to provide a closed circuit communication system employing many adjacent narrow bands of frequency in which each narrow band carries a number of information signals.

A further object of the invention is to provide for alternate transmission of a pair of frequencies bearing a constant ratio.

Another object is to provide receiving apparatus which phase detects during alternate instantaneous intervals information from carriers of differing frequency without use of transmitted reference frequencies.

A further object is to provide an information transmission system in which a channel of binary coded information is transmitted as two selectable transmission frequencies and other such channels are simultaneously impressed thereon as like phase modulations.

Another object is to provide a method of communication of separate information signals appearing as discrete phase and frequency modulations of a carrier wave.

A still further object of the invention is to double the capacity of a system by combining frequency-shift and phase-shift keying of information upon a narrow band of carrier frequency.

In order to double the number of channels of information which may be transmitted in a given frequency band this invention employs a signal of fundamental frequency generated at the transmitter, multiplies this frequency to preferably adjacent harmonics thereof, gates these for transmission in alternate intervals determined by one information keying signal, modulates both harmonic signals in phase by one or more additional information keying signals, transmits the combined result, which is first separated at the receiver and then demodulated to recover each information signal. Special techniques are developed to recover without error the phase step information, which would be inaccurate or ambiguous in the absence of special relationships between the frequencies transmitted, and improved techniques for phase comparison at the receiver, and these problems will be briefly described before proceeding with the detailed description.

In an information transmitting system employing degrees of phase shift according to the information transmitted and in which the receiving apparatus is required to read out this information it is obviously necessary to compare the phase instantaneously received with that of a reference signal corresponding to zero shift at the transmitting apparatus. Patent application Serial No. 731,334 filed November 12, 1958, by M. D. McFarlane and C. A. Crafts, now Patent No. 3,112,448, discloses one form of phase-shift keyed communication system to which this invention may be applied. A phase demodulation apparatus is disclosed in Serial No. 64,856, now Patent No. 3,078,344, filed October 25, 1960, by Cecil A. Crafts et al. Patent application Serial No. 755,088, now Patent No. 3,119,964, filed August 14, 1958, by Cecil A. Crafts also discloses a form of communication system employing phase-shift keying of a constant frequency, and illustrates other features of such a communication system employable with this invention.

Additional features and objectives of this invention will be more clearly apparent as the invention is described in connection with the drawings of which:

FIG. 1 is a block diagram of the system according to this invention.

FIGS. 2*a* and 2*b* show wave forms as developed in the transmitter and modified by frequency-shift keying and by phase-shift keying and the resulting signals derived at the receiver of this system, each corresponding to a channel of transmitted information.

Figure 1:
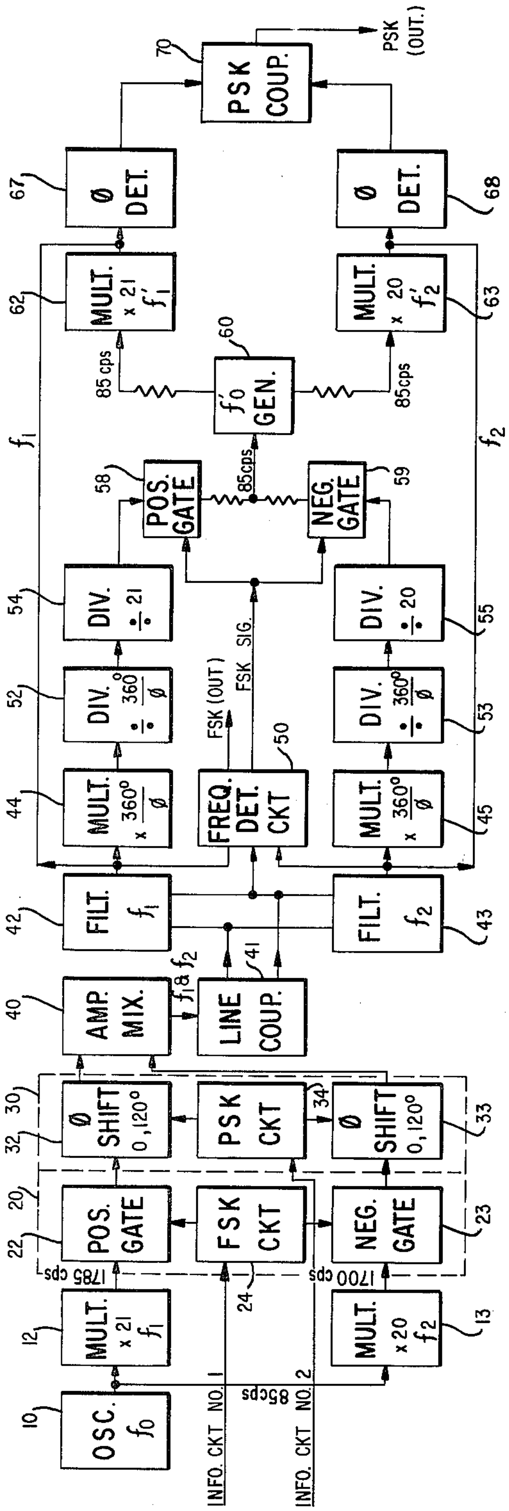

Referring now more particularly to FIG. 1 it will be noted that the oscillator 10 is a device for generating a fundamental frequency signal, and is of conventional design having the usual components of a Hartley oscillator, as more particularly described in connection with FIG. 3. The frequency $f_0$ is here taken, by way of illustration only, as of 85 cycles. This fundamental frequency may be chosen in accordance with the needs, and would normally vary particularly for multiplexing purposes, adjacent frequency bands differing by some 10 percent from each other, being simultaneously transmittable over the same closed circuit or in a radio link. Each such frequency band would be handled in the manner described herein concerning the illustrative fundamental frequency of 85 c.p.s. multiplied to adjacent harmonics thereof such that one or another of these harmonics may be transmitted one at a time, the keyed shifting therebetween constituting one channel of information. It is convenient, for example, to multiply the fundamental frequency by 21 for one frequency channel and by 20 for the other frequency channel, shown in upper and lower rows in the transmitting and receiving apparatus illustrated in FIG. 1. While some other choice of harmonics of the fundamental frequency might be employed, multiplication by 20 and 21 produces a band width limited to approximately 5 percent, either side of the mean, which is very suitable for frequency-shift keying, at the same time conserving the frequency spectrum in order to permit a greater degree of multiplexing, either in a closed loop communication system or in a system wherein the linkage of transmitter and receiver is via radio. In a closed circuit system one frequency $f_0$ might be 85 cycles while another might be in the neighborhood of 76 cycles and a third in the neighborhood of 95 cycles, by way of illustration.

Oscillator 10 is shown as having a frequency output $f_0$ one part going to a frequency multiplier 12 which has an output of 1785 c.p.s. Such a multiplier would normally consist of two units like that illustrated in FIG. 4, one multiplying the 85 cycle wave to 255 c.p.s. whereas the second unit would again multiply this output by 7 to produce the desired 1785 cycles. The second part of the output of oscillator 10 goes through a frequency multiplier 13 to produce an output 20 times the frequency of the input, and consists, for example, of two units such as the multiplier FIG. 4, one to multiply the fundamental frequency by 4 and the second unit multiplying the 340 cycle output of the first by 5 to produce the 1700 c.p.s. output desired. While it might be possible to produce the desired outputs in single units employing, for example, the 20th and 21st harmonic of the fundamental, considerably decreased efficiency would result. This makes advisable a two-step multiplication for each of the multipliers 12 and 13.

There is thus produced in the upper row of blocks in FIG. 1 a transmission frequency $f_1$ being harmonic of $f_0$, and in the lower line of FIG. 1, a transmission frequency $f_2$, being a different harmonic of $f_0$. While $f_1$ and $f_2$ are illustrated as adjacent harmonics of $f_0$, the system is, of course, adaptable to other adjacent or non-adjacent harmonics of $f_0$, these being selected for maximum utilization of the frequency band occupied by the frequencies necessary to produce only the frequency-shift information communication system. Such a single channel information communication channel is only a component of a multiplexing system employing many frequency bands, closely spaced to achieve the greatest possible number of information channels in a closed loop system. The phase-shift channel or channels of this invention require no additional frequencies for the additional channels in each band of the system, but superimpose phase-shift information on whichever one of the two frequencies is instantly being transmitted, i.e. $f_1$ or $f_2$.

To accomplish the purpose of this invention it is desirable that the two frequencies alternatively selected for transmission in a frequency-shift-keyed information channel shall be related to each other in a predetermined fashion such that a receiver apparatus may recover the phase modulation information without ambiguity. It is for this reason that the oscillator 10 has been given an output $f_0$ whose frequency is multiplied to a harmonic thereof for each of the information channel frequencies $f_1$ and $f_2$.

A gating circuit is required to determine which of the two generated frequencies shall be transmitted at any instant. Such a gating circuit is illustrated generally at 20 as consisting of a positive gate 22 interposed in one frequency channel and a negative gate 23 interposed in the other frequency channel. A frequency-shift-keying arrangement as illustrated in block 24 operates to control either the positive gate or the negative gate. Various forms of gate are available for this purpose varying in degrees of complexity. Gate 22 might, for example, be a biased diode shorting circuit from block 12 output to ground, the bias thereof being controlled by a switch contained in block 24, such that closing of the switch grounds the output from frequency multiplier 12, at its connection to the phase shift network, thereby to prevent the transmission of the frequency $f_1$ during the closing period of the switch. The gate 23 might likewise ground the output from the frequency multiplier 13 when the position of the switch 24 permits the output of block 12 to reach the phase shift network. Suitable circuits for this purpose are well known in the art and need not further be described here. It is merely sufficient that the FSK circuit of block 24 turn on gate 22 or gate 23 alternatively so that one channel or the other is transmitted to the phase shift network for that channel at any instant in which the other frequency is not transmitted to its phase shift network. The outputs from gates 22 and 23, being alternative and not simultaneous, could be transmitted at any instant or interval of time and information as to which is actually transmitted constitutes one channel of information.

A phase shift network 30 is interposed between gates 22 and 23 and the transmission line. A phase-shift-keyed information channel, in accordance with the principles of this invention, and as previously disclosed in the referenced co-pending patent applications, requires a phase-shift keying arrangement or circuit which effects a phase-shift such as one-third or one-fifth cycle, being an integral fraction of a cycle, such that when the transmitted frequency is multiplied to one of the lower harmonics thereof at the receiver the transmitted signals, of whatever phase, are exactly synchronously related to this harmonic as generated in the receiver. By this means the system as here disclosed, and as further described in the reference patent applications, is able to reproduce the phase-shift information, without the transmission of a reference frequency or dependence upon a locally generated signal which would inevitably wander in frequency and phase from that at the transmitter. It is thus sufficient for the present disclosure to note that the phase shift is a simple integral fraction (herein meaning the reciprocal of an integer) of a cycle of whichever frequency is being transmitted at any instant.

Frequency shifts of 120° or 72° are best adapted to a system of this character for the reasons noted in connection with the referenced applications, particularly since a three-phase component signal of which only two phases are actually transmitted provides a means for avoiding ambiguity of phase information at the receiver and for instantly correcting any lack of synchronism thereat with the zero phase position at the transmitting station. As here illustrated the phase shift will accordingly be taken as of zero or 120°. It might equally well be taken as zero or 240°, which corresponds to a negative shift of 120°. It is, of course, to be understood that a cycle divided into 5 equal parts corresponding to 72° each provides the same freedom from ambiguity and the same opportunity for automatic correction of phase error, and at the transmitter, providing two channels of binary information to be added to the one channel of information in the frequency shift channel. It is accordingly to be understood that the illustration of 120° phase shift applies equally well to the 72° phase shift, except that additional recovery information would be obtained and additional circuitry to present the output of the phase shift detector in double binary form, such as disclosed in a referenced co-pending patent application.

The phase shift circuit generally illustrated at 30 accordingly differs from the frequency shift circuit 20 in two respects. Since the frequency $f_1$ differs from the frequency $f_2$, use of the same delay (or advance) circuitry for changing the phase applied to the two frequencies would result in different phase angles of shift. Thus a different adjustment of a phase shifter is employed in the $f_1$ circuit from that employed in the $f_2$ circuit, each being adjusted for an exact shift of 120° of that frequency. The second difference resides in the fact that the phase-shift-key circuit 34 operates to shift the phase of both $f_1$ and $f_2$ simultaneously. There are several reasons for this. As the system is employed the phase-shift keying may be synchronized with the frequency-shift keying, or may be operated independently thereof, as would be convenient for independent channels of information. The FSK channel of information, like the PSK channel, is operated at high speed such that it cannot be known in advance which frequency $f_1$ or $f_2$ will be transmitted to the receiver at the instant of any shift in phase by means of the key device 34. Thus it will not be known whether a phase shift should be applied at 32 or at 33 at any instant of operation of the key 34. Phase-shift keying is therefor applied simultaneously to both phase shifters 32 and 33. Since only $f_1$ or $f_2$ will be active at any instant only one actually transmits a phase shift. Nevertheless at any time during which the PSK key 34 is actuated to cause a phase shift at the time when the FSK key 24 is actuated (or deactuated) it is necessary that the phase-shift information be transmitted without interruption. This is accomplished inasmuch as the key 34 is effective to shift phase either at 32 or 33 whenever the key 34 is actuated. Accordingly, two completely independent channels of information are impressed upon the product of the oscillator 10 either to transmit $f_1$ or $f_2$, according to key 24, and to transmit $f_1$ or $f_2$ shifted in phase, or unshifted, in accordance with the information independently placed thereon by operation of key 34. No ambiguity results because but one frequency at a time is passed through gates 22 and 23 and only one passes to the next stage.

A line coupling device indicated at 40 and 41 thus receives $f_1$ and $f_2$ alternatively. A combining element 40 consists of a conventional mixer tube and amplifier comprising, for example, a dual triode amplifier with a common cathode connection. The output is then conveniently connected to the line, or to a radio link, by means of a common connection from the triode anode elements to a transformer primary and thence to a D.C. voltage supply, a second winding of the transformer being connected to the line or to the radio link network.

In order to recover the information in the two channels at the receiving station a frequency detecting circuit is employed to determine which of the frequencies $f_1$ or $f_2$ was instantaneously being transmitted. In order to eliminate noise, interference with adjacent frequency bands in a multiplexed system, and to otherwise clean up the signal for better reception it is desirable first to filter the received frequencies in circuits of high Q, preferably employing one filter for $f_1$ and another filter for $f_2$ to achieve the maximum separation of signal from noise, thus to improve the certainty of correct information reproduction. A sharply tuned filter 42 for $f_1$ is thus connected across the receiving line or the output of a line or radio receiving link, and a sharply tuned filter 43 tuned exactly to $f_2$ is connected in parallel with filter 42. Thus either filter 42 or filter 43 will be passing a signal at any instant regardless of whether the FSK or the PSK circuit is operated. It might be assumed, for example, that $f_1$ is transmitted in the absence of a keying signal at 24 and that $f_1$ would be received without phase shift when PSK switch 34 is not actuated. Such a signal output from 42 would thus represent a space signal on both information channels. A mark signal on the FSK channel would be represented by frequency $f_2$ being passed by filter 43. A mark signal on the PSK channel of information would be represented in the output either of filter 42 or filter 43 by a shift in the phase of the received frequency from that which would have been received had circuit 34 not been operated.

A determination of whether $f_1$ or $f_2$ was the transmitted frequency is made by a circuit generally referred to at 50 as a frequency discriminator of which the output would correspond with the signal input at 24, as will later be described. Various arrangements are available for frequency discrimination which are well known in the art, employable in block 50 for this purpose. A particular form will be described in connection with FIG. 5.

The phase detection system particularly adapted to this invention, as hereinbefore referenced, generates from the received frequency a harmonic thereof synchronously related to the received frequency, for example $f_1$, the harmonic being selected for synchronism with each of the possible phases transmitted by the transmitter. For a three-phase system of which two phases are transmitted the third harmonic obviously achieves its purpose. The output of filter 42 is therefore passed not only to the frequency determining circuit 50 but also to a multiplying circuit 44 which is of the type illustrated in FIG. 4 and may be identical except for frequency determining components with one unit of the multiplier 12. It is designed to produce that harmonic of $f_1$ which is compatable with shifted and unshifted phases of $f_1$ as generated in the transmitter. The multiplication factor may therefore be described as $360°/\phi$. This $\phi$ is the same angle referred to in phase shifter blocks 32 and 33. When filter 43 has an output $f_2$ this frequency is also multipled by 360°/$\phi$ in a frequency multiplier or harmonic generator 45.

In the examples taken the output of multiplier 44 is 5,355 c.p.s. and the output of multiplier 45 is 5,100 c.p.s. In neither case will this output display any indication of whether or not the phase has been shifted by the circuit 34. These outputs therefore represent phase reference signals bearing a definite relationship in time and phase to the transmitted $f_1$ and $f_2$ signals and are employed as phase references with which the output of filters 42 and 43 can be compared.

Figure 4:
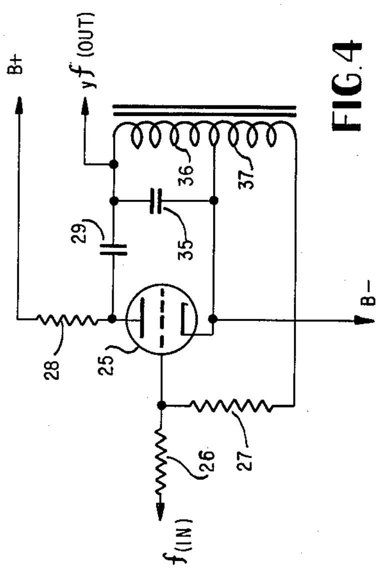
FIG. 4 shows a basic multiply or divide circuit used singly or in multiples to produce a harmonic of the fundamental, or to divide a produced wave.
Figure 3:
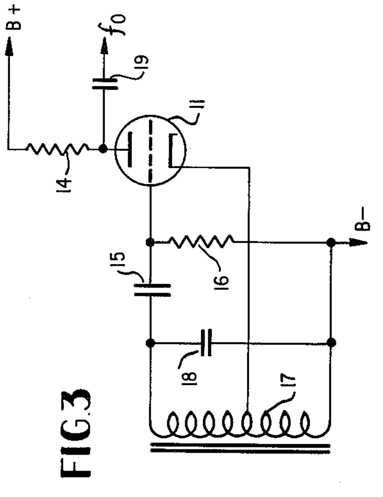
FIG. 3 shows a basic oscillator of suitable form to produce a fundamental frequency.

It will be noted in connection with the description of FIG. 4 that a harmonic generator or a simple frequency divider resembles the basic oscillator of FIG. 3 and has high Q, with a degree of feedback such that the output is substantially sinusoidal, having considerable flywheel action. To achieve these characteristics it is operated in a condition near that of self-oscillation. It is therefore possible for such a multiplier or divider circuit to behave occasionally as a free-running oscillator. Small differences in frequency either from $f_1$ or from $f_2$ as received could result in some degree of phase shift in the reference frequency outputs of multipliers 44 and 45. This may at times be sufficient to cause some ambiguity when this reference frequency is compared with that passed by filter 42 or filter 43. It has accordingly been found desirable not to compare the frequency information contained in the output of filter 42 or 43 with a phase reference taken indiscriminately from either 42 or 43. Instead it is preferable that the phase information on frequency $f_1$ be compared with a reference derived from received $f_1$ and that phase information on frequency $f_2$ be derived from a reference derived from received frequency $f_2$. At the same time it is essential that such a reference be available at all times inasmuch as the receiver has no indication of when $f_1$ or $f_2$ will be received, or when a shift will occur from one to the other. For these reasons the output of multipliers 44 and 45 are not simply divided by the multiplication factor thereof, but in addition are further reduced to the fundamental frequency $f_0$ as will presently be described.

Frequency divider 52 receives the harmonic of $f_1$ produced at multiplier 44 and divides it to produce a frequency $f_1$ not containing the phase shift information. Likewise, frequency divider 53 divides the output of multiplier 45 by the factor of multiplication therein to produce $f_2$ as output. The unmodulated frequencies $f_1$ and $f_2$ are then each divided by the respective multiplication factors contained therein as produced in the transmitter at multipliers 12 and 13. Frequency divider 54 applied to the output $f_1$ from divider 52 provides for a frequency division by a factor 21, while the frequency divider 55 effects division of the output of divider 53 by the factor 20, each producing the original 85 cycle frequency $f_0$ generated at 10. Divider 54 may comprise two units, one for dividing by 7 and one for dividing by 3, arranged in sequence. Likewise the divider 55 may consist of a first unit dividing $f_2$ by 5 and the second unit dividing this quotient by 4 inversely to the frequency multiplication of multiplier 13. In both cases a frequency of 85 cycles is produced. This frequency is devoid of either phase or frequency modulation.

The possibility that the multiplying or dividing circuitry in the $f_1$ or the $f_2$ channel may have had transient intervals of free-running and may therefore not be sufficiently accurate for phase comparison purposes results in a degree of uncertainty, which is avoided by a selection of the synchronizing frequency $f_1$ or $f_2$ from that frequency signal instantaneously received at the time the phase comparison is to be made. There is available from the frequency discriminator 50 an output which indicates which of the two frequencies was being received. This output is applied by means of a positive or a negative gate, in accordance with the polarity of the signal output from the detector 50, to control conduction either in a positive gate 58 or a negative gate 59, thereby to pass the regenerated frequency $f_0$ either from the $f_1$ source at filter 42 or from the $f_2$ source at filter 43, in accordance with which of these filters is then passing a signal.

A positive output from detector 50 might, for example, operate a diode biased gate 58 to pass the signal from divider 54 so long as the detector 50 had a positive output. Similarly, negative gate 59 might be a diode biased gate effective to pass the signal from divider 55 when filter 43 is passing an $f_2$ signal. Positive gate 58 and negative gate 59 are connected to a common output for the control of a high Q circuit 60 which is effective to pass the frequency $f_0'$ precisely adjusted to that source thus selected from the frequency then being received. Block 60 in FIG. 1 thus shows a frequency $f_0'$ there generated which is the fundamental frequency $f_0$. It may comprise a circuit as shown in FIG. 4 in which the output from 58 or 59 is applied to the grid of an oscillation-governing tube with a suitable tank circuit adjusted precisely to the $f_0$ frequency. The output of generator 60 is passed through multiplier 62 or multiplier 63 to produce $f_1'$ or $f_2'$ as the reference signal for comparison with the output of filter 42 or filter 43, whichever one is then producing an output.

The output of multiplier 62 is connected to a phase detector 67 and the output of multiplier 63 is connected to phase detector 68, each effective to determine whether zero phase or one of the phase shifted conditions is impressed upon that frequency by the phase shift keying circuit 34. The output of detector 67, or of detector 68, is the desired output for the PSK information circuit at any particular instant. It is desirable to have a coupler effective to utilize the output of detector 67 or of detector 68 in the same circuit. For this purpose the output circuit 70 is connected to both 67 and 68 having a single output therefrom which is the PSK output circuit. This circuit is effective to produce a signal of identical form with that impressed upon either the $f_1$ frequency or upon the $f_2$ frequency. This will generally be in the form of a square wave like that of the PSK output.

Figure 2A:
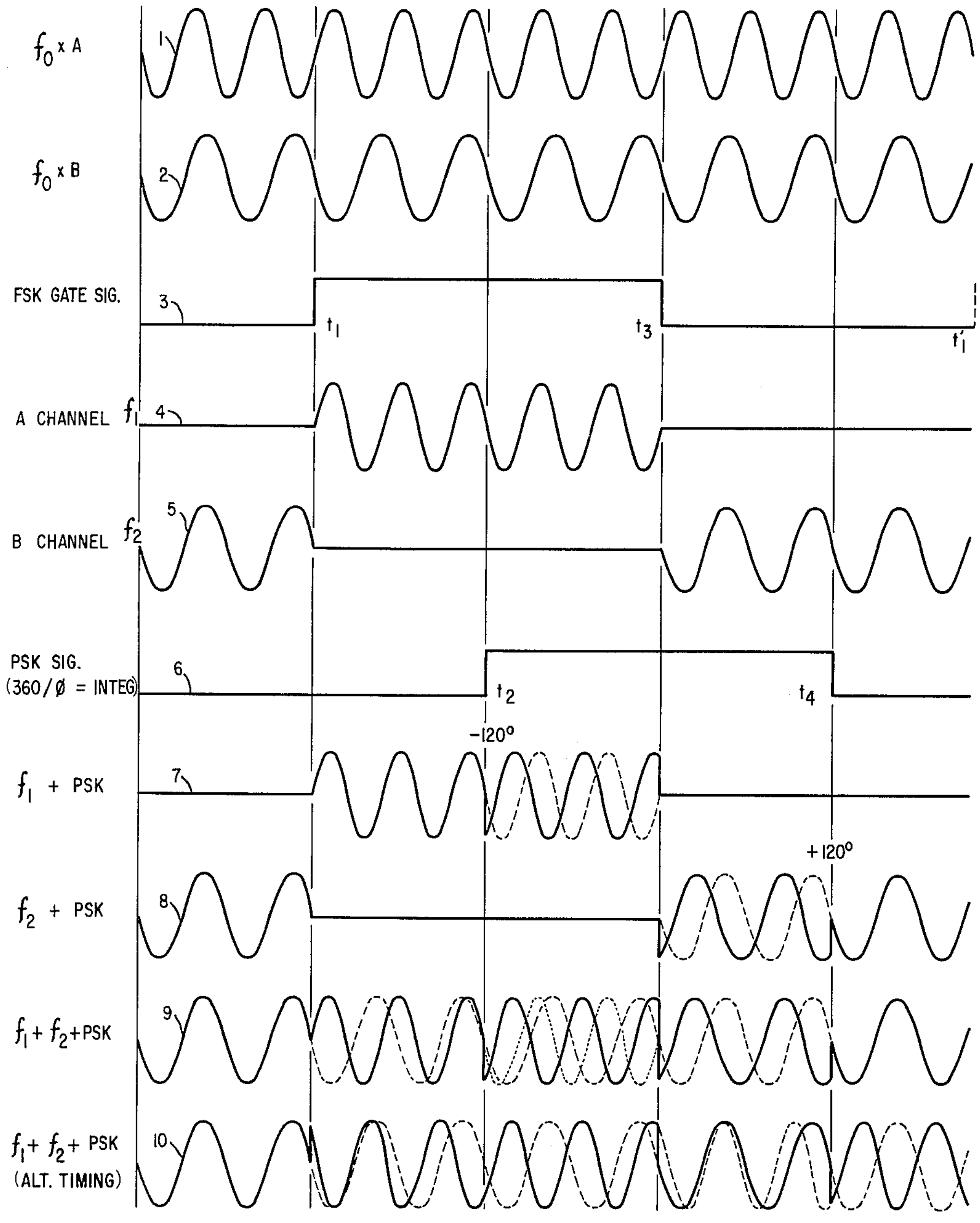

Referring now to FIG. 2, lines 1 and 2 illustrate two harmonically related frequencies derived from a single fundamental frequency $f_0$. For purposes of illustration these are illustrated as four and five times the fundamental frequency, rather than 20 and 21 times the frequency $f_0$, in order better to show differences therebetween in the succeeding diagrams of the figure. It is, of course, understood that $f_1$ might be five times $f_0$ and $f_2$ might be four times $f_0$ in a useful communication system, or any other integrally related multiples. The choice of 20 and 21 times the fundamental frequency would normally be selected because of its higher inherent use of the frequency spectrum available. Line 3 illustrates an information signal suitable for frequency shifting of the transmitter from $f_1$ to $f_2$. There is shown at $t_1$ a shift and at $t_3$ a return to the original frequency, and $t_1'$ represents a further shift as at $t_1$. The information signal to be transmitted may, of course, either be zero shift when a "space" is to be indicated followed by a positive or negative voltage when a "mark" is to be indicated, or it may be zero-centered having a negative voltage for one frequency and positive voltage for another frequency. This is a matter of design choice, the combination of positive and negative shifts requiring additional processing and a broader frequency band. Line 4 of FIG. 1 illustrates the interval of time between $t_1$ and $t_3$ in which $f_1$ is transmitted in the A channel and line 5 illustrates the intervals in which $f_2$ is transmitted in the B channel, as governed by positive and negative gates 22 and 23.

Line 6 represents a similar information signal which may be regarded as positive voltage between times $t_2$ and $t_4$. It may be in all respects like the signal on line 3 and may occur simultaneously, or may be completely uncorrelated with the timing $t_1$ and $t_3$, inasmuch as the FSK and the PSK information channels may be completely independent and remotely located from each other. Line 7 represents a frequency $f_1$ transmitted between $t_1$ and $t_3$ and in which the phase shift information commencing at $t_2$ is superimposed. The dotted line shows the phase of $f_1$ as it would have occurred had no phase shift been superimposed thereon. Line 8 represents that portion of line 2 which is transmitted outside of the interval $t_1$ and $t_3$, being unaffected by phase shift prior to $t_2$ since no phase shift signal is assumed to occur until $t_2$. Between $t_2$ and $t_3$, $f_2$ is not transmitted and therefore phase shift information is only conveyed via $f_1$, as illustrated on line 7. However, at $t_3$, $f_2$ begins to be transmitted, but not in its initial zero phase condition inasmuch as FSK is operated until $t_4$, after which $f_1$ is transmitted at zero phase as in line 2. The dotted portion of line 8 represents the zero phase as would be transmitted in the absence of a signal on line 6.

Line 9 represents the output of the line coupler and is a combination of $f_1$ and $f_2$, governed by FSK, and including the second channel of information from PSK. The dashed line of FIG. 9 represents the continued transmission of $f_2$ whereas the dotted line represents the continued transmission of the frequency being transmitted at the time the phase shift is inserted as though the shift had not occurred. Thus between $t_0$ and $t_1$ both information channels indicate space and between $t_1$ and $t_2$ the dashed line indicates the same condition. The solid line between $t_1$ and $t_2$ represents a shift from $f_2$ to $f_1$, while between $t_2$ and $t_3$, $f_1$ is transmitted in a phase shifted condition. At $t_3$ the transmitter reverts to $f_2$ but with the phase shift condition therein. Beyond $t_4$ the solid line represents a space indication on both channels. Between $t_2$ and $t_3$ the dotted line is the frequency shifted signal $f_1$ without phase change and the dashed line is a continuation of the $f_2$ as between $t_0$ and $t_1$. The dashed line between $t_3$ and $t_4$ is of $f_2$ frequency without phase shift.

Since the phase shift occurring at $t_2$ might occur simultaneously with the frequency shift at $t_1$, and since the duration of signals on line 3 and line 6 are not necessarily alike the phase shift might occur first or with no change in frequency at all. Line 10 illustrates another form of the output signal passed to the line by coupler 40 in which different order and duration of information keying signals from that shown on line 9 is represented.

Figure 2B:
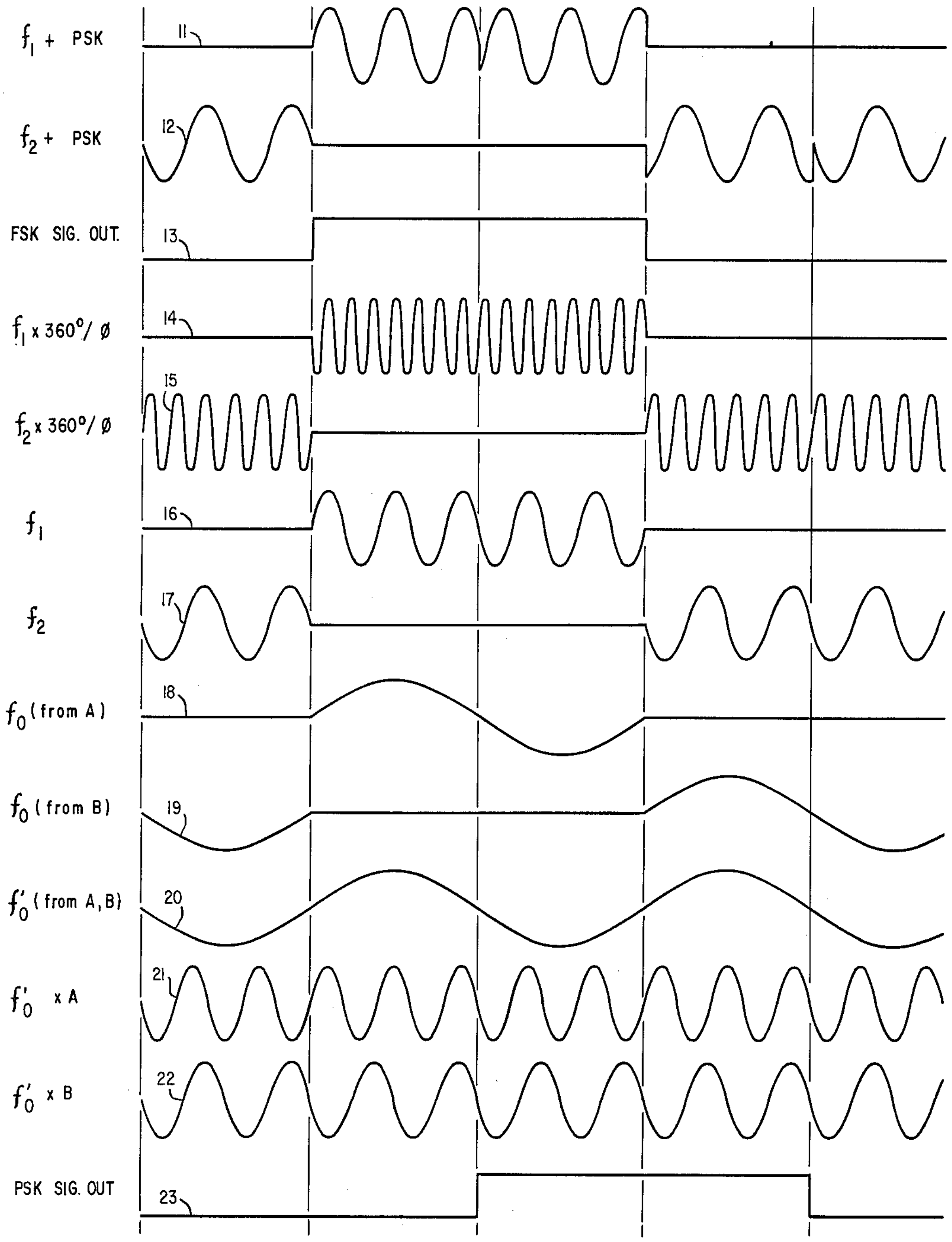

Line 11 of FIG. 2*b* represents the signal passed by filter 42 in the receiving apparatus and line 12 represents the signal passed by filter 43, each corresponding to that signal represented in line 9. Line 13 represents the output of the frequency discriminating circuit 50 shown as FSK out, and corresponds in all respects to the signal on line 3. Line 14 represents the harmonic of $f_1$ produced in multiplier 44 and line 15 represents the harmonic of $f_2$ produced in multiplier 45. It is noted that the frequency shift information displayed in line 11 is absent in line 14 and that in line 12 is absent from line 15. Lines 16 and 17 correspond to the signal resulting from division in frequency dividers 52 and 53. Lines 18 and 19 represent the fundamental frequency $f_0$ as derived from $f_1$ and $f_2$, respectively. These signals are presumably in phase and of identical frequency because of the manner of their derivation. Line 20 represents the result of adding lines 18 and 19 with the exception that line 20 is derived from the generator 60 which is a flywheel circuit, preferably involving amplification, and limited by positive gate 58 and negative gate 59 such that the component parts of line 20 are derived from lines 18 and 19 with complete certainty as to which of lines 18 or 19 controls frequency and phase of line 20. As hereinbefore mentioned this provides assurance that the phase reference signal is derived from the frequency transmitted at each instant of reception will immediately control the phase and frequency of the referenced signal but without displaying any frequency shift keyed information therein since both are derived from the appropriate harmonics of the received signal which is effective to synchronize the waves and at the same time display no phase shift information.

Lines 21 and 22 represent the result of multiplication by 21 and by 20 of the fundamental frequency $f_0'$. These waves are employed in phase shift detector 67 and 68 as phase references for comparison with the actually received waves from filters 42 and 43. During the time when $f_1$ is passed by filter 42 phase shifter 67 passes through the coupler and the output 70 an indication of the phase shift at frequency $f_1$ by comparison with $f_1'$. During the interval when filter 43 passes $f_2$ phase shifter 68 derives and passes to the coupler 70 a signal corresponding to phase shifts of $f_2$ occurring at the transmitter, which is the result of comparison of $f_2$ and $f_2'$. There is accordingly an output indicated at PSK (out) which continuously indicates the phase shift information and of the same form as that represented in line 6.

FIG. 3 illustrates a basic oscillator circuit generally of the Hartley type. A vacuum tube, transistor, or the like, generally indicated at 11 as a triode, is supplied from a suitable source of D.C. voltage by way of an impedance 14, and has a control element coupled by capacitor 15 and grid resistor 16 to the opposite supply terminal and to an oscillator circuit comprising inductor 17 and capacitor 18. The element of the amplifier 11 corresponding to the cathode of the illustrated triode is preferably connected to the tank circuit element 17 intermediate the two ends thereof whereby a feedback is provided to maintain the amplifier in oscillation under control of the high Q tank circuit. Suitable output coupling is provided by capacitor 19 to produce output frequency $f_0$.

FIG. 4 illustrates a basic multiplier or divider circuit of which a tube or transistor element is generally indicated at 25 being supplied with D.C. voltage by way of an impedance 28 and having a control element therein coupled, for example, by resistor 26 to the output of a preceding multiplier or divider, or to the capacitor 19 of FIG. 3. Resistor 27 forms a stabilizing bias or grid leak and is preferably connected to the oscillatory output of the amplifier as by connection of the amplified voltage through condenser 29 to a tank circuit comprising inductor 36 and capacitor 35, both connected to the cathode of the amplifier 25. A further inductance element 37, forming a continuation of inductance 36, is preferably connected to the control connection 27 to form a feedback path for stabilizing the amplified oscillation at the frequency determined by the tank elements 35 and 36. From the tank circuit connection opposite the connection to the stabilizer 27 there is taken an output which bears a relation $y$ times the input, or $yf$. For the purposes of this invention $y$ is an integer or an integral fraction depending upon the factor of multiplication or division desired for the particular application of the device of FIG. 4. This factor is selected by adjustment of the tank circuit comprising elements 35 and 36. In accordance with the apparatus previously illustrated and described for use with this invention $y$ variously has values of 3, 4, 5, 7 or the reciprocals thereof. When employed as element 60 $y$ has a value of 1.

Figures 5, 6, 7:
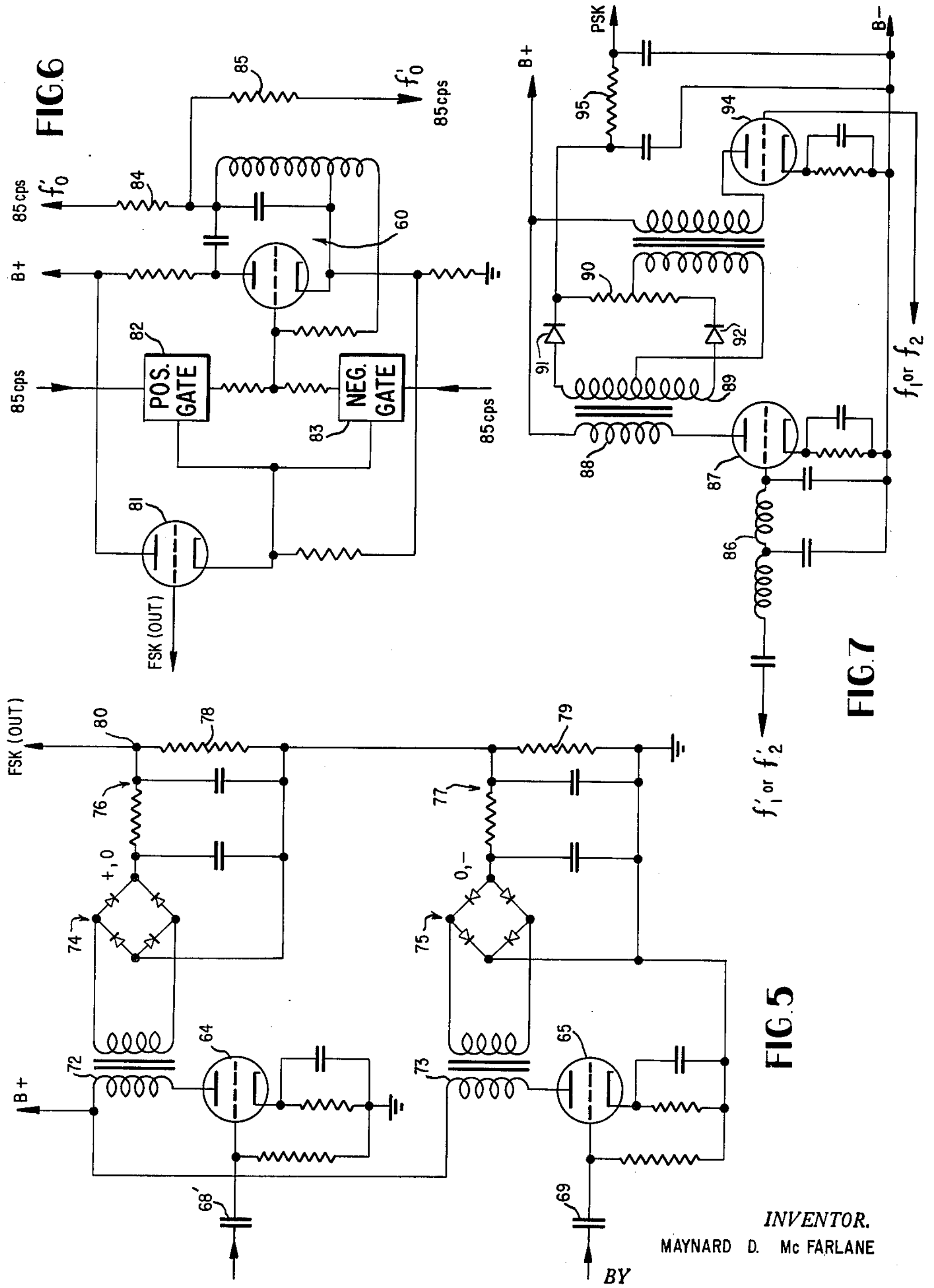
FIG. 5 shows a suitable frequency detecting circuit applicable in the receiver of the present invention for recovering the frequency modulation information.
FIG. 6 illustrates circuitry for generating at the receiving station a fundamental frequency comparable to that generated at the transmitter governed in frequency and phase by the particular frequency channel active at that instant at the transmitter.
FIG. 7 illustrates a phase detecting circuit for recovering phase-keyed information from comparison of the transmitted and the derived frequencies generated in the device of FIG. 6.

In FIG. 5 there is illustrated a suitable form of frequency discriminating circuit comprising a pair of amplifying devices 64 and 65, each connected to a suitable power supply and responsively connected to the outputs of filters 42 and 43, respectively, by means of capacitors 68′ and 69, the amplifiers being represented as triode tubes with suitable cathode bias and grid leak arrangements for producing an output in a tube plate load circuit only when there is input introduced via capacitor 68′ or 69. Amplifiers 64 and 65 are connected independently to the power supply via impedance elements 72 and 73 which are preferably of form of the primary of a transformer of which the secondary in each case is connected to a full wave rectifying device illustrated generally at 74 and 75, respectively. When rectifiers 74 and 75 are of full wave bridge type the outputs of the secondaries of the transformers are connected across one diagonal of the bridge in each case and the rectified output is taken from the opposite diagonal of the respective rectifier bridge. When so connected the rectifier 74 is arranged to produce across its output either a zero voltage, when no signal is delivered to the amplifier 64, or a positive voltage when such a signal is delivered, amplified, and passed by transformer 72. Bridge 75, however, is connected for opposite polarity output such that the signal amplified by amplifier 65 produces an output from the bridge rectifier either of zero or of negative voltage. In order to complete the output for a frequency-shift keyed signal corresponding to that of line 3 of FIG. 2, the outputs of rectifiers 74 and 75 are combined. The output from 74 is filtered in a conventional D.C. filter illustrated at 76, and the output of bridge 75 is filtered similarly by a like filter 77. A load resistor 78 is preferably connected across output filter 76, and a similar output resistor 79 is connected across filter 77, whereon in each case a developed voltage from the bridge rectifier is impressed. To produce a unitary output the positive end of rectifier 75 is grounded and the negative end thereof is connected to the negative end of the output of bridge 74 by connecting adjacent ends of resistors 78 and 79 together. The output from the discriminator can therefore be taken at terminal 80, which is connected at the positive side of the output of the filter 76, and will have impressed thereon the combined voltages in resistors 78 and 79.

It may be here noted that the output at terminal 80 may be either positive or negative for the reason that bridge 75 can produce either zero or a negative signal and bridge 74 can produce either zero or a positive signal, the two being connected in series at their outputs. When no signal is produced and passed by bridge 74 the output appears entirely across resistor 79 as a negative voltage. On the other hand, when $f_1$ is being received bridge 74 has an output which is positive, across resistor 78, and bridge 75 has a zero output such that the voltage across 78 is the output at 80.

Grounding the detecting circuit at a different point would obviously permit taking a square wave output of either positive or negative sign, exclusively, or of any form in between. The form illustrated is convenient for the operation of a cathode follower circuit or other coupling device illustrated at 81 for the passing of a positive or a negative signal to control positive gate 82 or negative gate 83 as hereinbefore referenced. This circuitry is illustrated in FIG. 6 wherein an 85 c.p.s. signal derived from $f_1$, as passed by frequency divider 54, reaches positive gate 82, and an 85 c.p.s. signal derived from received signal $f_2$, as passed by frequency divider 55, reaches negative gate 83, both of which are coupled by resistive or other suitable means to a generator indicated at 60 comprising generally the same elements described in connection with FIG. 4. Gates 82 and 83 might, for example, be simple biased diode gates arranged to receive bias from terminal 80 via coupling device 81 and so interconnected that a positive signal opens gate 82 to permit an 85 cycle signal derived from $f_1$ to pass to the device 60. Upon receipt of a negative signal from coupler 81 negative gate 83 opens to cause the signal derived from frequency channel $f_2$ to be passed to generator 60 in control of the oscillator action within. Of whatever form generator 60 may take it contains an amplifier and a high Q flywheel or tank circuit having a positive feedback coupled to enhance the signal delivered to the amplifier from the selected channel $f_1$ or $f_2$. Output from the tank circuit is taken via coupling impedance 84 and a like coupling impedance 85 for control of the generation of $f_1'$ and $f_2'$.

FIG. 7 illustrates a form of phase comparison device previously known in the art and illustrated in the aforementioned patent applications as employed in a phase shift communication system. It consists essentially in each channel of a flywheel or sign wave shaping element 86 connected to the output of the $f_1'$ generator and to the output of the $f_2'$ generator, respectively. Amplifier 87 receives the shaped wave and amplifies the same in a conventional manner to produce an output signal in the primary circuit 88 of a transformer. The secondary 89 of the transformer is center-tapped and has each end connected via forward-conducting diodes 91 and 92 to the ends of center-tapped resistor 90. One end of resistor 90 may be grounded or connected to the negative supply terminal of the power supply for the amplifier 87. Between the center taps of resistor 90 and secondary 89 there is connected the secondary of a transformer 93 of which the primary forms a load impedance for an amplifier 94 connected between the positive and negative terminals of the power supply. The grid or control element of the amplifier 94 connects to the output of filter 42 and to the output of the filter 43.

A voltage is produced at the ungrounded end of resistor 90 which is positive when a difference of phase exists between the $f_1$ signal from filter 42 and the generated signal $f_1'$. The output of the phase-shift indicator may be filtered in some conventional manner as indicated generally at 95 and becomes an output showing a positive voltage whenever a phase shift is contained in the signal passed by filter 42. Likewise, frequency $f_2$ is compared with reference frequency $f_2'$ and the output of each is connected via suitable coupling devices to an output circuit coupler such as 70 in FIG. 1, and the combined output is indicative of whether a phase shift is instantly being impressed upon either $f_1$ or $f_2$ at the transmitter.

It will be noted that the phase-shift coupler does not receive an output from both channels at the same time, and the lack of a phase shift voltage is evident when neither channel detects a phase difference, only one of which can serve as a source of phase-shift frequency information delivered to the output coupler 70 at any time. Nevertheless, a signal will exist uninterrupted at the coupler 70 even though the transmitter shifts from $f_1$ to $f_2$ and the receiving apparatus shifts back and forth from $f_1$ to $f_2$.

The invention as described may take other forms with variations in the components employed to perform the functions herein described and it is to be understood that the system herein described is illustrative rather than limiting, as to the method and apparatus to combine phase and frequency modulation systems. The choice of frequencies, circuit components, coupling means or harmonics and subharmonics employed is a matter of design and expediency, differing with circumstances of use. The system is likewise not limited to a three or five-step phase shifting procedure nor to the use of a single frequency shift in any band of frequencies transmitted. It is adaptable, for example, to two channels of frequency shift information and to two or more channels of phase-shift information by the addition of suitable circuitry for selection of frequency of transmission, for frequency detection, for phase selection, and for phase detection. It is accordingly intended that equivalent circuitry to perform the functions of this invention, as herein taught, are intended to be included in the scope thereof, as set forth in the appended claims.

What is claimed is:

1. A communication system comprising;
means generating a fundamental frequency,
means generating a pair of harmonically related frequencies from said fundamental frequency, said frequencies being conveyed in adjacently related channels,
means coupling said frequency channels to corresponding frequency channels in a receiving apparatus,
means effective to permit only one of said frequencies to be transmitted to said receiving apparatus at any instant, means effectively impressed similar phase shift steps of less than 180° in each said channel in accordance with information to be transmitted, frequency detecting means in said receiving apparatus indicating which of said frequencies is instantly transmitted, means effective in said receiving apparatus developing a reference signal from the received frequency devoid of said frequency shifted information and synchronized with said generated harmonic frequency, means effective in said receiving apparatus for comparing the phase of said received frequency with the phase of said developed frequency, and means in said receiving apparatus for indicating the existence of a phase shift difference as an information output.

2. A combined frequency shift and phase shift communication system for the transmission of multiple channels of information comprising;

means generating in a first channel a first frequency signal of predetermined frequency, means generating in a second channel a second frequency signal bearing a predetermined frequency relation to first said frequency, transmission means for said signals, means coupling either said first or said second frequency signal to said transmission means in accordance with the position of a frequency shift keying device, phase shift means in each said channel effective upon actuation to shift the phase at each said frequency by the same integral fraction of a cycle, means effective simultaneously to shift the phase in each said channel by said integral fraction in accordance with actuation of a second keying device, receiving means impressing said signals as received in separate receiving channels one for each said frequency, means coupled to last said means deriving an information signal indicative of which said frequency is instantly being transmitted, means in each said receiver channel multipling the received frequency by the reciprocal of said fraction, means in each said channel effective to compare the phase of said received frequency with the phase of a reference frequency derived from said multiplied frequency, and means combining the outputs of said phase comparator circuits to produce an information signal indicating continuously the actuation condition of said second keying device.

3. In a system for transmitting and receiving frequency shifted signals in keyed binary form wherein two related frequencies less than an octave apart are alternatively transmitted and received;

transmitter means operative upon actuation to shift the phase of each frequency transmitted by a phase angle which is in each case the same fractional portion of a cycle, receiver means separating into channels said transmitted frequencies;

means deriving in each said channel the harmonic of said frequency received which is the reciprocal of said fraction of a cycle, means in each said channel dividing said derived harmonic frequency by said reciprocal thereby to produce in each channel a reference signal of the frequency transmitted, means in each channel comparing said reference frequency with said received frequency, and output means indicating continuously the information applied for modifying the transmitted frequency in phase.

4. A communication system for a plurality of binary information signals comprising;

means generating first and second frequency signals each being a different harmonic of a common fundamental frequency, means selecting for transmission one of said frequency signals under control of one of said information signals, discrete electrical conveying means for each said frequency signal, means simultaneously altering the delay characteristics of each said conveying means by the same phase angle which is a delay interval inversely related to said harmonic of the fundamental frequency therein conveyed, means responsive to a second of information signal effective to control said phase angle in both said channels regardless of which channel is active, means coupling both signal conveying means to a common output whereby a continuous signal modulated as to phase and frequency is transmitted, receiving means continuously indicating which said frequency is transmitted, receiving means indicating continuously which of said phase angles is instantly being transmitted, and means responsive to said receiving means for continuously indicating the frequency transmitted, and to said means indicating which of said phase angles is transmitted, for combining frequency and phase indications of said information signals, respectively, in a single output signal.

5. A communication system including;

a generator producing an A.C. wave of a fundamental frequency, first frequency multiplying means connected responsively to said generator producing a signal which is a harmonic of said frequency, second frequency multiplying means connected responsively to said generator producing a second signal which is a different harmonic of said frequency, a pair of gating means respectively connected to the outputs of said multiplying means, means operating said gating means for conduction in alternate time intervals in accordance with a keyed information signal to be transmitted, means impressing on each said harmonic signal a further keyed information signal comprising a predetermined degree of phase shift which for each said harmonic frequency is the same integral fraction of a cycle, means transmitting in mutually exclusive intervals each of said harmonic signals containing said keyed information signals, receiving means coupled to said transmitting means, frequency detecting means effective to produce an output signal indicating which of said harmonic signals is received, phase reference signal generating means for each said harmonic signal received effective to produce therefrom a further harmonic synchronously related thereto for each said predetermined phase shift, means comparing the phase of each received harmonic signal with said reference signal developed therefrom, and means indicating whether said phase shift is effective at each instant regardless of which said harmonic signal is transmitted.

6. A communication system comprising;

means generating a fundamental frequency, means multiplying said frequency to produce two carrier frequencies harmonically related to said fundamental frequency, means transmitting said carrier frequencies in sequenced contiguous time steps coded to convey information in binary form from a first source, means impressing on each said carrier frequency in accordance with information in binary form from a second source a like phase shift of an exact submultiple of a cycle thereof, means receiving said carrier frequency signals, means indicating which said frequency is instantly being transmitted thereby to recover the information from said first source, means generating from each said received signal a reference signal free from said phase shift information, means comparing the phase of said reference signal with that of the instantly received signal, and means indicating the result of said comparison as the binary information from said second source.

7. The method of combining frequency shift keyed information with phase shift keyed information within an A.C. communication system which comprises;

generating a signal of a first frequency, multiplexing the frequency of said signal by different whole numbers in separate channels, simultaneously shifting the phase of the signal in each said channel by a different time interval reciprocally so related to said numbers as to provide like phase shifts of the signals after multiplication to differing frequencies, selectively transmitting the signal in one or the other of said channels in accordance with a presence or absence of a second signal, and recovering said first and second signals, respectively, by phase discrimination of the received signal and frequency discrimination between said signals received.

8. The method of combining in an A.C. communication system key-stepped modulations of a carrier wave which comprises;

generating two signal frequencies from said wave, step modulating said frequencies by different time delay intervals reciprocally related to said frequencies to effect like angular phase shifts simultaneously therein in accordance with a first keying signal, and successively transmitting said frequencies in accordance with a second keying signal.

9. The method of recovering from a combined keyed phase shift and keyed frequency shift information communication signal each of the keying signals therefor comprising;

separating into separate processing channels each frequency received, developing an output signal continuously indicative of which said frequency is being received as a first output, developing in each said channel a reference frequency free of said phase shift information and synchronized with the received frequency, comparing the phase of the instantly received frequency with the phase of the developed reference frequency, and indicating the result of the comparison as a second information output.

10. Apparatus for transmitting and receiving information as combined keyed frequency and keyed phase modulations of a carrier wave comprising;

a signal generator tuned to a first frequency, harmonic generators responsive to said signal to produce first and second signals at frequencies which are adjacent integral multiples of said first frequency greater than 2, plural gate means one in each said harmonic generator each arranged to pass said harmonic signal therein upon receipt of respectively opposite gating signals, a gatting signal generator for said opposite signals connected in control of both said gate means, last said generator supplying said opposite signals in adjacent time intervals according to a first information signal, phase shifting means for each said harmonic signal instantly gated to be passed under control of a second information signal operating to provide phase shifts simultaneously therein of equal amount substantially less than 180°, transmitting means responsive to said signal instantly gated to be passed, receiver means indicative of the phase relation between said transmitted signal and a reference signal devoid of said phase shift information, and means detecting which of said harmonic signals is transmitted.

11. Apparatus according to claim 10 including;

means altering the phase output of each said harmonic signal by $1/x$ cycle thereof, $x$ being an integer, upon application thereto of an actuating signal, means applying said actuating signal simultaneously to each last said means under control of a second information signal, receiver means generating a reference signal $x$ times the frequency of said instantly transmitted signal, means deriving from said generated reference frequency a signal of said instantly transmitted frequency, means comparing the phases of said derived and transmitted signals of each said frequency, and means responsive to said comparing means to indicate the phase alteration applied at the transmitter.

12. Apparatus according to claim 10 including in a receiver for detecting said frequency instantly transmitted;

means responsive to the receipt of each said frequency for generating a reference signal of the same frequency devoid of phase shift information, means responsive to said reference signal for generating a signal of said first frequency, means shifting control of last said signal from one said reference signal to another said reference signal as the receiver signal shifts in frequency, means generating from last said signal a further reference signal corresponding to each said harmonic signal, and means indicating the phase angle difference between said further reference signal and the signal of either frequency then being transmitted.

13. An information transmitting system for a plurality of simultaneous keying signal channels comprising;

a plural frequency signal generating and transmitting apparatus, means selecting for transmission at each instant one of said frequencies, exclusively, under control of one said keying signal channel, means selecting one of a plurality of equal stepped phase displacements applied to each said signal frequency under control of another said keying channel, said displacements including zero and a cycle fraction which is the reciprocal of an integer greater than 2, receiver means segregating said transmitted frequencies as received into separate electrical paths, frequency discriminating means actuated by signals in said paths to generate as a system output a signal including the information in said one keying signal channel, phase discriminating means in each said electrical path responsive to a reference signal therefor independent of said phase displacements for generating as a system output a signal including the information in another said keying channel, and means in each said channel responsive to the frequency therein for generating said reference signal.

14. In the system of claim 13 said receiver means including frequency multipliers in each said path to produce the frequency segregated times said integer, means dividing the resulting frequency by said integer, and means applying the divided frequency to said phase discriminating means.

15. In the system of claim 13 said receiver means including a reference frequency generator alternatively actuated by the signals in the active one of said electrical paths, and means generating therefrom said reference signal for said active electrical path.

16. In the system of claim 13 said generating and transmitting apparatus producing two frequencies each a different multiple of a common frequency.

17. In the system of claim 16 said keying signal channels including means producing positive and negative gating signals according to information respectively therein, and gating circuits in control of said frequency selected for transmission and said phase displacement applied thereto, respectively.

18. In the system of claim 13 said signal generating apparatus being controlled to produce two frequencies each a multiple of a common frequency therein generated, and said receiver reference signal being locally generated from the instantly received said frequency.

19. In a system for transmitting and receiving multiple binary coded information signals in multiple simultaneous step-modulations of a carrier wave, means generating a fundamental frequency, means multiplying by different integers said frequency in separate transmitter signal paths, means actuated by one said coded information signal gating open in alternate time sequence said transmitter signal paths, means actuated by another said coded information signal step-modulating each said frequency, said modulation being by equal phase steps each an integral submultiple of a cycle of the frequency in said gated-open path, means coupling said outputs to a communication link, receiver means segregating said frequencies into processing paths, means developing an output signal according to which said processing path is active at each instant, means generating a phase reference signal of said fundamental frequency from said active path, means detecting said phase modulation in each said processing path, and means developing an output signal according to the phase step of modulation instantly detected.

20. In a system according to claim 19 means responsive to first said output signal controlling said fundamental reference signal generating means to synchronize the same with the instantly received signal in said active path.

21. In a system according to claim 19 receiver means generating by frequency multiplication and division reference frequency signals at the frequencies received and segregated, each devoid of phase modulation, and means controlling said reference signal of fundamental frequency in response to first said output signal whereby the same is instantly controlled by said active path.

22. In a system for transmitting and receiving plural binary information signals applied as phase and frequency keyed modulations of a carrier wave simultaneously applied;

receiver apparatus segregating the discrete frequencies transmitted into plural processing circuits, frequency discriminator means responsively connected to each said circuit having an output signal in binary form, phase detection means responsive to the received frequency signal in each said circuit, phase reference signal generating means responsive to said received signal in each circuit having an output fed to said detection means, and means generating a further output signal in response to phase differences thereby detected.

23. In a communication link for transmitting and receiving simultaneous coded information signals from a plurality of inputs;

a signal generator having an output of a first frequency, a first multiplying circuit connected to receive output from said generator and to produce a frequency which is an integral multiple thereof, a second multiplying circuit connected to receive output from said generator and to produce a frequency which is a multiple thereof differing from said integral multiple by unity, both said frequencies being selected for passage through a common multiple-channel-separation filter, a phase shifting network in the output of each said circuit adjusted when actuated to phase shift said multiplied frequency therein by the same fraction of a cycle being the reciprocal of an integer and of duration inversely related to said multiples, respectively, means responsive to one said information input signal passing one said multiplied frequency during one predeterminable information signal level and the other said multiplied frequency at all other times, means responsive to a second said information signal actuating said phase shifting networks for both said frequencies during one predeterminable information signal level and deactuating said networks during another predeterminable information signal level, and means coupling a selected one of said multiplied frequency signals as phase modulated by second said information signal; into said communication link for transmission in alternate adjacent intervals.

24. In the system of claim 23 said frequency passing means including key operated gates in each said multiplying circuit and both under control of mutually exclusive keying signals from one said information input.

25. In the system of claim 23 said phase shifting means comprising delay networks in said circuits adjusted differently to produce the same angle of shift upon actuation, said actuation being a keyed gating signal applied simultaneously to both said circuits in response to predetermined levels in a further said input signal, whereby said coupling means receives one or another said frequency according to first said information signal and an instant said phase shift determined by said further signal at each instant.

26. A digital information receiver for combined keyed phase shift and keyed frequency shift signals comprising;

receiver means segregating said transmitted frequencies as received into separate electrical paths, frequency discriminating means actuated by respective signals in said paths to generate as a system output a signal representing the information in one said keying signal, means recovering in each said electrical path a reference signal independent of said phase displacements, and phase discriminating means in each said electrical path generating as a system output a signal responsive to said segregated and reference signals therein for representing the information in another said keying signal.

27. In the system of claim 26 said receiver means including frequency multipliers in each said path to produce the frequency segregated times an integer selected to produce like resulting frequencies;

means dividing the resulting frequency by said integer, and means applying the divided frequency to said phase discriminating means.

28. In the system of claim 26 said receiver means including a reference frequency generator alternatively actuated by the signals in the active one of said electrical paths;

and means generating therefrom said reference signal for said active electrical path.

29. In a system for transmitting multiple binary coded information signals in multiple simultaneous step-modulations of a carrier wave;

means generating a fundamental frequency, means multiplying by different integers said frequency in separate transmitter signal paths, means actuated by one said coded information signal gating open in alternate time sequence said transmitter signal paths, means actuated by another said coded information signal step-phase modulating each said frequency by an amount inversely related to said integers, such that said modulation is in equal phase steps, and means coupling said outputs to a communication link.

References Cited by the Examiner

UNITED STATES PATENTS

| | | | |
|---|---|---|---|
| 2,879,387 | 3/1959 | Kahn | 178—66 |
| 2,991,354 | 7/1961 | Crafts | 325—320 |
| 3,031,527 | 4/1962 | Barton et al. | 325—30 |
| 3,032,611 | 5/1962 | Montgomery | 178—66 |
| 3,059,188 | 10/1962 | Voelcker | 178—46 |

DAVID G. REDINBAUGH, *Primary Examiner.*